United States Patent [19]

Wood et al.

[11] Patent Number: 5,368,744
[45] Date of Patent: * Nov. 29, 1994

[54] METHODS FOR TREATING WASTEWATER

[75] Inventors: Michael R. Wood, Philadelphia; Stephen R. Vasconcellos, Doylestown, both of Pa.

[73] Assignee: Betz Laboratories, Inc., Trevose, Pa.

[*] Notice: The portion of the term of this patent subsequent to Aug. 10, 2010 has been disclaimed.

[21] Appl. No.: 100,904

[22] Filed: Aug. 3, 1993

[51] Int. Cl.$^5$ .................. C02F 1/56; C08F 293/00
[52] U.S. Cl. ................... 210/734; 525/273; 525/263; 525/294; 525/308; 525/299
[58] Field of Search ........... 525/294, 273, 299, 263; 210/734

[56] References Cited

U.S. PATENT DOCUMENTS

| | | | |
|---|---|---|---|
| Re. 28,474 | 7/1974 | Anderson et al. | 260/29.6 H |
| Re. 28,576 | 10/1975 | Anderson et al. | 260/29.6 H |
| 3,284,393 | 11/1966 | Vanderhoff et al. | 260/29.6 |
| 4,432,881 | 2/1984 | Evani | 252/8.5 |
| 4,521,580 | 6/1985 | Turner et al. | 526/307.2 |
| 4,528,348 | 7/1985 | Turner et al. | 526/225 |
| 4,730,028 | 3/1988 | Bock et al. | 526/225 |
| 4,835,234 | 3/1989 | Valint et al. | 526/258 |
| 4,906,716 | 3/1990 | Yang et al. | 526/307.2 |
| 5,182,331 | 1/1993 | Liao et al. | 525/294 |
| 5,234,604 | 8/1993 | Liao | 210/734 |

Primary Examiner—James J. Seidleck
Assistant Examiner—I. Zemel
Attorney, Agent, or Firm—Alexander D. Ricci; Philip H. Von Neida

[57] ABSTRACT

A method for the flocculation of wastewater comprising a block copolymer having the formula:

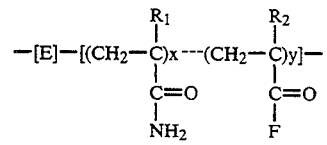

wherein E is a polymeric segment obtained from the polymerization of hydrophobic monomers, x when present is a nonionic monomer, y is a cationic monomer, $R_1$ and $R_2$ are the same or different and are H or a lower alkyl group from $C_1$ to $C_3$ and F is a salt of a ammonium cation. The block copolymer is added to the wastewater particularly oily wastewater, to flocculate contaminants.

11 Claims, No Drawings

METHODS FOR TREATING WASTEWATER

FIELD OF THE INVENTION

Water soluble block copolymers containing water soluble and water insoluble monomers prove useful as flocculants for primary wastewater treatment.

BACKGROUND OF THE INVENTION

There is an increasing usage of water soluble polymers and copolymers in wastewater treatment industries. These compounds have shown desirable utility for the purpose of flocculating contaminants from contaminated water.

The efficacies of the polymers or copolymers used will vary depending upon the type of monomers chosen to form the polymer or copoymer, the molecular weight of the synthesized molecule and, in the case of a copolymer, the placement of the selected monomers on the backbone of the copolymer. It is the latter characteristic that is the focus of the present invention.

Copolymers may be synthesized without attention to the distribution of the two base monomers along its backbone resulting in a random distribution of these monomers. Synthesis may be controlled, however, to form a copolymer having long sequences of monomers, e.g. A and B, as follows:

—AAAA—BBBB—AAAAA—BBBB—

This formation results in compounds referred to as block copolymers.

Block copolymers exhibit unique properties and as a result are more desirable than random copolymers or a blend of the two homopolymers synthesized from the respective monomers. The industrial importance of block copolymers has increased markedly in recent years for these reasons.

SUMMARY OF THE INVENTION

The present invention relates to wastewater treatment utilizing water soluble block copolymers containing water soluble and water insoluble monomers. These polymers provide effective flocculation specifically for induced air flotation and dissolved air flotation processes.

DESCRIPTION OF THE RELATED ART

U.S. Pat. No. 5,182,331 teaches treatment of wastewater utilizing a block copolymer containing a polymeric segment obtained from polymerization of hydrophobic or water insoluble monomers attached to a polymer chain obtained from polymerization of one or more water soluble monomers.

U.S. Pat. Nos. 4,521,580 and 4,528,348 disclose a method of using surfactants to solubilize water insoluble monomers such as octyl acrylamide in order to copolymerize with acrylamide.

U.S. Pat. No. 4,906,716 discloses a process of incorporating hydrophobic water insoluble monomers, such as alkyl acrylamides which are solid at room temperature, with acrylamide into a water soluble copolymer. The process involved heating the hydrophobic water insoluble monomers to above their melting point.

U.S. Pat. No. 4,835,234 discloses hydrophobically associating terpolymers containing acrylamide, cationic monomer and water insoluble monomers such as higher alkylacrylate or alkylamide. All monomers are mixed together in solution prior to a micellar polymerization. The resulting polymers are random copolymers in nature.

U.S. Pat. No. 4,432,881 discloses a water soluble composition for thickening aqueous liquids comprising a water soluble polymer having pendant hydrophobic groups and a water dispersible surfactant, such as sodium oleate.

U.S. Pat. No. 4,730,028 discloses a process for producing sulfonate-containing terpolymers of water soluble monomers with water insoluble monomers which act as viscofiers of aqueous mediums. The process occurs in the presence of a water soluble surfactant to ensure dispersion of the various monomers.

DETAILED DESCRIPTION OF THE INVENTION

Disclosed are water soluble block copolymers containing water soluble and water insoluble monomers comprising adding said copolymers to wastewater as primary wastewater treatments. These copolymers are effective at flocculation, particularly induced air flotation (IAF) and dissolved air flotation (DAF).

The block copolymer of the invention has the general structure:

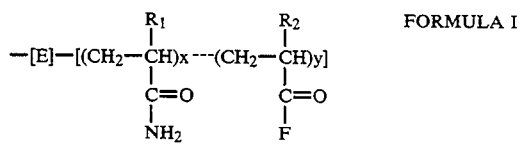

FORMULA I wherein E is a polymeric segment obtained from the polymerization of hydrophobic or water insoluble monomers. Examples of such monomers include alkyl acrylamides, alkyl methacrylamides, alkyl acrylates, alkyl methacrylates, and alkylstyrenes. Preferably, the hydrophobic monomer is an alkyl acrylate having 4 to about 16 carbon atoms in the alkyl group such as 2-ethylhexyl acrylate. Other suitable hydrophobic or water insoluble monomers include the higher alkyl esters of ethylenically unsaturated carboxylic acids such as alkyl dodecyl acrylate, dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; vinyl alkylates wherein alkyl has at least 8 carbons such as vinyl laurate and vinyl stearate, vinyl alkyl ethers such as dodecyl vinyl ether and hexadecyl vinyl ether; N-vinyl amides such as N-vinyl lauramide and N-vinyl stearamide; and aralkylstyrenes such as t-butyl styrene. Of the foregoing hydrophobic monomers, the alkyl esters of acrylic acid and methacrylic acid wherein alkyl has from 4 to 16 carbon atoms, are preferred. The hydrophobic polymers are not water soluble and can be prepared by precipitation or emulsion polymerization techniques.

Monomer x, when present, in the Formula I is a nonionic monomer such as acrylamide or alkylacrylamide. $R_1$ and $R_2$ is H or a lower alkyl group having $C_1$ to $C_3$. Monomer y is a cationic monomer. F in the above formula is a salt of an ammonium cation, such as $NHR_3N^+$ $(R_{4,5,6})M^-$ or $OR_3N^+$ $(R_{4,5,6})M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and $M^-$ is an anion, such as chloride, bromide, or methyl or hydrogen sulfate. Typical cationic monomers are 2-acryloxyethyltrimethyl ammonium chloride (AETAC), 3-methacrylamidopropyltrimethyl ammonium chloride (MAPTAC), 2-methacryloylethyltrimethyl ammonium chloride (METAC) and diallyl dimethyl ammonium chloride (DADMAC), etc.

The molar percentage x:y of nonionic monomer: cationic monomer, may fall within the range of between 0:100 to 95:5. The molar percentages of x and y must add up to 100%. It is to be understood that more than one kind of cationic monomer may be present in the Formula I.

At present, the preferred water soluble block copolymer for sludge dewatering applications is:

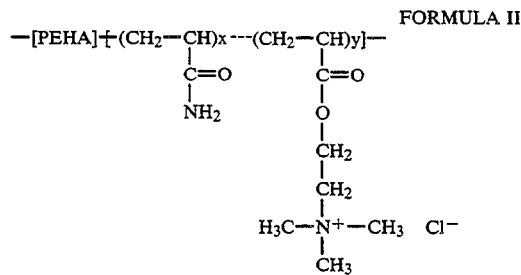

FORMULA II wherein PEHA is poly(2-ethylhexyl acrylate) obtained from polymerization of 2-ethylhexyl acrylate (EHA) initiated by a diperoxide initiator, 2,5-dihydroperoxy-2,5-dimethylhexane (Luperox 2,5-2,5, Pennwalt). The resulting poly(EHA) is water insoluble and has a hydrophobic nature. The number average molecular weight (Mn) of poly(EHA) may fall within the range of 500 to 1,000,000. Preferably, the number average molecular weight will be within the range of 1,000 to 500,000, with the range of about 5,000 to about 200,000 being even more desirable. The key criterion is that the resulting block copolymer be water soluble. Since the diperoxide initiator is used to initiate EHA, the resulting poly(EHA) still contains peroxide for further reaction. It is then copolymerized with monomers x and y to form a block copolymer.

In this invention, the preferred monomer x is acrylamide and monomer y is 2-acryloxyethyltrimethyl ammonium chloride (AETAC). The molar percentage of x:y is from about 0:100 to 95:5, with the molar percentage of from about 10:90 to 75:25 being preferred. The block copolymers are prepared by a water-in-oil emulsion technique. Such processes have been disclosed in U.S. Pat. Nos. 3,284,393, Re. 28,474 and Re. 28,576, herein incorporated by reference. The resulting copolymers may also be further isolated by precipitating it in an organic solvent such as acetone and dried to a powder form. The powder can be easily dissolved in an aqueous medium for use in desired applications.

Branching agents such as polyethyleneglycol di(meth) acrylate, methylene bis(meth)acrylamide, N-vinyl acrylamide, allyl glycidyl ether, glycidyl acrylate and the like may also be added, providing the resulting block copolymer is water soluble. It is to be understood that the aforementioned polymerization methods do not in any way limit the synthesis of polymers according to this invention. Any of the well known chain transfer agents familiar to those skilled in the art may be used to control the molecular weight. Those include, but are not limited to, lower alkyl alcohols such as isopropanol, amines, mercaptans, phosphites, thioacids, allyl alcohol and the like.

The structure of the block copolymer is substantiated by a conventional solution viscosity study and $C^{13}$ NMR spectroscopy. The molecular weight of the resulting block copolymer is not critical, as long as it is soluble in water.

EXPERIMENTAL SYNTHESIS OF BLOCK COPOLYMERS

EXAMPLE 1

Peroxide-Containing Poly(2-ethylhexyl acrylate)

A suitable reaction flask was equipped with a condenser, a thermometer, a nitrogen inlet, and an overhead mechanical agitator. The flask was charged with 150 g of 2-ethylhexyl acrylate (EHA, Aldrich), 8 g of 70% 2,5-dihydroperoxy-2,5-dimethylhexane (Luperox 2,5-2,5, Lucidol) and 300 g of methanol. The resulting hazy solution was gradually heated to 50° C. under nitrogen. A sodium metabisulfite solution (SMB, 1 g in 10 g water) was prepared separately and sparged with nitrogen.

The bisulfite solution was then added slowly to the reaction flask. Almost immediately the slightly hazy solution turned into a white colloidal dispersion and the polymer precipitate gradually formed. After the addition of bisulfite solution was complete, the reaction temperature was raised to 60° C. for about 40 minutes. The solvent was then distilled off under reduced pressure at an elevated temperature to give brownish polymer paste. No residual monomer was detected by $C^{13}$ NMR. The resulting polymer was then redissolved in a low volatile oil (Soltrol 145, Philips Petroleum). The Brookfield viscosity was 780 cps (49.7% polymer) and the molecular weights determined by gel permeation chromatography were $Mn=9.5\times10^3$, $Mw=7.4\times10^4$ g/mole.

EXAMPLES 2-5

Block Copolymers

Block copolymers of acrylamide (AM), 2-acryloyloxyethyltrimethyl ammonium chloride (AETAC) and peroxide-containing poly(EHA) of Example I were prepared using a water-in-oil emulsion polymerization technique. The typical polymerization procedure is shown as follows.

A reaction flask similar to that described in Example 1 was charged with an oil phase which contained sorbitan monooleate, oil and peroxide containing poly(EHA) of Example 1. The exact charges are shown in Table I.

An aqueous phase was prepared separately which contained acrylamide (AM), 2-acryloyloxyethyltrimethyl ammonium chloride (AETAC), water, and a chelating agent (Table I). The solution was further adjusted with acid to pH 4.5.

The aqueous phase was added to the oil phase and the resulting emulsion was further homogenized with a homogenizer to obtain a stable water-in-oil emulsion. The emulsion was purged with nitrogen for 30 minutes.

The polymerization was initiated by slowly adding a dilute sodium metabisulfite solution (SMB) to the emulsion under nitrogen and the temperature was maintained at 50°–85° C. by an external cooling. After the addition, the emulsion was held at 50°–85° C. for 30 minutes. A trace amount of t-butylhydroperoxide (t-BHP) was then added to the emulsion. The emulsion was held at 50° C. for an additional 30 minutes before cooled. A blend of surfactants was finally added to the emulsion.

$C^{13}$ NMR showed that there was no detectable amount of residual monomer in the resulting emulsion. The emulsion readily inverted into an aqueous solution when added to water.

TABLE I

| | Preparation of Block Copolymers | | | |
|---|---|---|---|---|
| Reagents Charged (grams) | Example 2 | Example 3 | Example 4 | Example 5 |
| Sorbitan monooleate | 10.47 | 10.47 | 12.82 | 10.16 |
| Example 1, Poly(EHA) | 37.78 | 37.78 | 37.83 | 20.00 |
| Soltrol 145 | 115.93 | 115.78 | 145.91 | 120.63 |
| 50% AM | 141.02 | 114.80 | 89.20 | — |
| 79.2% AETAC | 89.31 | 134.45 | 178.65 | 175.60 |
| D.I. Water | 52.34 | 56.31 | 104.31 | 102.65 |
| Versenex 80 | 0.64 | 0.62 | 0.53 | 0.54 |
| SMB | 5.00 | 5.00 | 5.00 | 2.65 |
| D.I. Water | 10.50 | 10.03 | 10.00 | 10.90 |
| t-BHP (70%) | 1.72 | 1.70 | 1.70 | 0.90 |
| D.I. Water | 10.33 | 10.26 | 10.00 | 10.09 |
| Tergitol 15-S-9 | 16.70 | 17.50 | 21.07 | 15.99 |
| Aerosol GPG | 4.18 | 4.38 | 5.27 | 4.00 |

Soltrol 145 = hydrocarbon oil, Phillips Petroleum
AM = acrylamide
AETAC = 2-acryloyloxyethyltrimethyl ammonium chloride
Versenex 80 = pentasodium diethylenetriamine pentraacetic acid solution, Dow
SMB = sodium metabisulfite
Tergitol 15-S-9 = C11-C15 secondary alcohol ethoxylate, Union Carbide
Aerosol GPG = dioctyl ester of sodium sulfosuccinic acid, American Cyanamid

EXAMPLE 6

Peroxide-Containing Poly(EHA)

A similar polymerization process as in Example 1 was utilized. The formulation was as follows:

| 2-ethylhexyl acrylate | 60.0 g |
|---|---|
| Luperox 2,5-2,5 | 0.7 |
| Methanol | 300.0 |
| Sodium metabisulfite | 0.6 |
| D.I. Water | 5.0 |

After polymerization was complete, a large excess of water was added to the mixture. The resulting water insoluble poly(EHA) was removed from the mixture and dried in a vacuum oven. The poly(EHA) obtained was redissolved in a low volatile oil (LOPS, Exxon) at a polymer concentration of 16.8% (w/w) and was to be used for Example 7.

EXAMPLE 7

Block Copolymer

Utilizing the similar procedure described in Examples 2–5, except that sulfur dioxide ($SO_2$) instead of SMB was used to activate the peroxide groups in the poly(EHA) of Example 6. In addition, Luperox 2,5-2,5 (Lucidol) instead of t-BHP was used to couple with $SO_2$ to react with residual monomer. $SO_2$ was added at once, the exotherm of the polymerization quickly raised the reaction temperature to 85° C.

Air was used occasionally to help control the reaction. The resulting polymer as precipitated in acetone and filtered. It was further dried in a vaccum oven to obtain a dry powder. The formulation was as follows:

| Sorbitan monooleate | 8.95 g |
|---|---|
| Atlas G-1086* | 10.35 |
| Example 6, Poly(EHA) | 127.34 |
| 50% AM | 137.02 |
| 79.2% AETAC | 155.56 |
| D.I. Water | 89.27 |
| Versenex 80 | 0.67 |
| Luperox 2,5-2,5 | 0.047 |
| D.I. Water | 5.08 |

*Atlas G-1086 = polyoxyethylene sorbitol hexa-oleate, ICI

The intrinsic viscosities of the resulting block copolymers are shown in Table II.

TABLE II

| | Block Copolymers | |
|---|---|---|
| Polymer | Intrinsic Viscosity (dl/g) | % Solids |
| Example 2 | 4.3 | 40.6 |
| Example 3 | 5.4 | 42.9 |
| Example 4 | 3.9 | 39.6 |
| Example 5 | 3.8 | 37.4 |
| Example 7 | 4.5 | — |

EXPERIMENTAL

For this example, wastewater from a refinery was treated. The substrate contained 0.10% solids at a pH=6.59. A laboratory IAF device, manufactured by WEMCO (Model #1+1), was used to evaluate performance. In Induced Air Flotation, air bubbles are formed by mechanical agitation due to a self-aerating rotor mechanism. The air bubbles, generated by shearing of the gas water mixture at high velocity, rise to the surface. As the bubbles rise, immiscible liquid droplets, such as oil particles, and suspended solids attach to the bubbles. The oil and solids gather in a dense froth at the surface, and are removed by skimming. To form the air bubbles, atmospheric air is used. The IAF process is enhanced by the addition of chemical treatments, which function by facilitating separation of oil from water, concentrating the suspended solids, and stabilizing the air bubbles to promote froth flotation. Treatment effectiveness was measured by comparing both the polymer dosages and subnatant turbidities, measured using a HACH Ratio Turbidimeter. Polymer A is the experimental block copolymer, while polymer B is a typical linear copolymer of the structure - $(AM)_m$-$(AETAC)_n$-, containing about 50% (mole basis) AETAC, conventionally used for these types of applications. The results are shown in the attached Table I. Subnatant sample collected for turbidity measurement 1 minute after the end of the following mixing procedure: 15 seconds of mixing at 900 RPM without air; 30 seconds of mixing at 900 RPM with air and froth collection.

TABLE I

| | Induced Air Flotation | | |
|---|---|---|---|
| | Oil in Water Emulsion Wastewater | | |
| | Substrate pH = 6.59 | | |
| | Total Solids = 0.10% | | |
| Treatment | Dosage (ppm Product) | ppm Polymer (Solids) | Subnatant Turbidity (NTU) |
| Blank | — | — | 87.5 |

TABLE I-continued

Induced Air Flotation
Oil in Water Emulsion Wastewater
Substrate pH = 6.59
Total Solids = 0.10%

| Treatment | Dosage (ppm Product) | ppm Polymer (Solids) | Subnatant Turbidity (NTU) |
|---|---|---|---|
| Polymer A | 8 | 3.7 | 12.6 |
| Polymer B | 6 | 2.2 | 10.2 |

These results show the effectiveness of the polymers as flocculants in wastewater systems, particularly those utilizing induced air flotation processing.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for treating oily wastewater by flocculating said wastewater comprising adding to said wastewater an effective flocculating amount of a block copolymer having the formula:

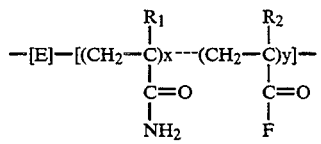

wherein E is a polymeric segment obtained from the polymerization of hydrophobic monomers, x when present is a nonionic monomer, y is a cationic monomer, $R_1$ and $R_2$ are the same or different and are H or a lower alkyl group from $C_1$ to $C_3$ and F is a salt of an ammonium cation.

2. The method as claimed in claim 1 wherein the hydrophobic monomer is selected from the group consisting of alkyl acrylate having from 4 to about 16 carbon atoms, the higher alkyl esters of ethylenically unsaturated carboxylic acids, alkaryl esters of ethylenically unsaturated carboxylic acids, N-alkyl ethylenically unsaturated amides, vinyl alkylates wherein the alkyl moiety has at least 8 carbon atoms, N-vinyl amides and aralkylstyrenes.

3. The method as claimed in claim 2 wherein the ethylenically unsaturated carboxylic acids of the higher alkyl esters are selected from the group consisting of acrylic acid and methacrylic acid.

4. The method as claimed in claim 2 wherein the alkyl acrylate is 2-ethylhexyl acrylate.

5. The method as claimed in claim 1 wherein the nonionic monomer is selected from the group consisting of acrylamide and alkylacrylamide.

6. The method as claimed in claim 5 wherein the nonionic monomer is acrylamide.

7. The method as claimed in claim 1 wherein the salt of the ammonium cation is selected from the group consisting of $NHR_3N^+$ ($R_{4, 5 \text{ and } 6}$) $M^-$ and $OR_3N^+$ ($R_{4, 5 \text{ and } 6}$) $M^-$, wherein $R_3$ is a $C_1$ to $C_4$ linear or branched alkylene group, $R_4$, $R_5$ and $R_6$ are selected from the group consisting of hydrogen, $C_1$ to $C_4$ linear or branched alkyl, $C_5$ to $C_8$ cycloalkyl, aromatic or alkylaromatic group and $M^-$ is an anion.

8. The method as claimed in claim 6 wherein $M^-$ is selected from the group consisting of chloride, bromide and methyl or hydrogen sulfate.

9. The method as claimed in claim 1 wherein the cationic monomer is selected from the group consisting of 2-acryloxyethyltrimethyl ammonium chloride, 3-methacrylamidopropyltrimethyl ammonium chloride, 2-methacryloylethyltrimethyl ammonium chloride and diallyl dimethyl ammonium chloride.

10. The method as claimed in claim 1 wherein said block copolymer has the formula:

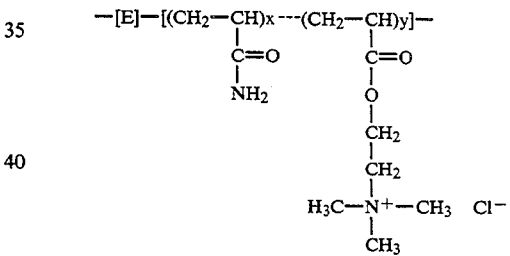

wherein E is a polymer of 2-ethylhexyl acrylate.

11. The method as claimed in claim 1 wherein the molar percentage of x:y is between 0:100 to 95:5, the total of x and y equalling 100%.

* * * * *